March 31, 1959 R. E. ALLEN ET AL 2,879,632
LENS CHUCK
Filed Oct. 16, 1956 3 Sheets-Sheet 1
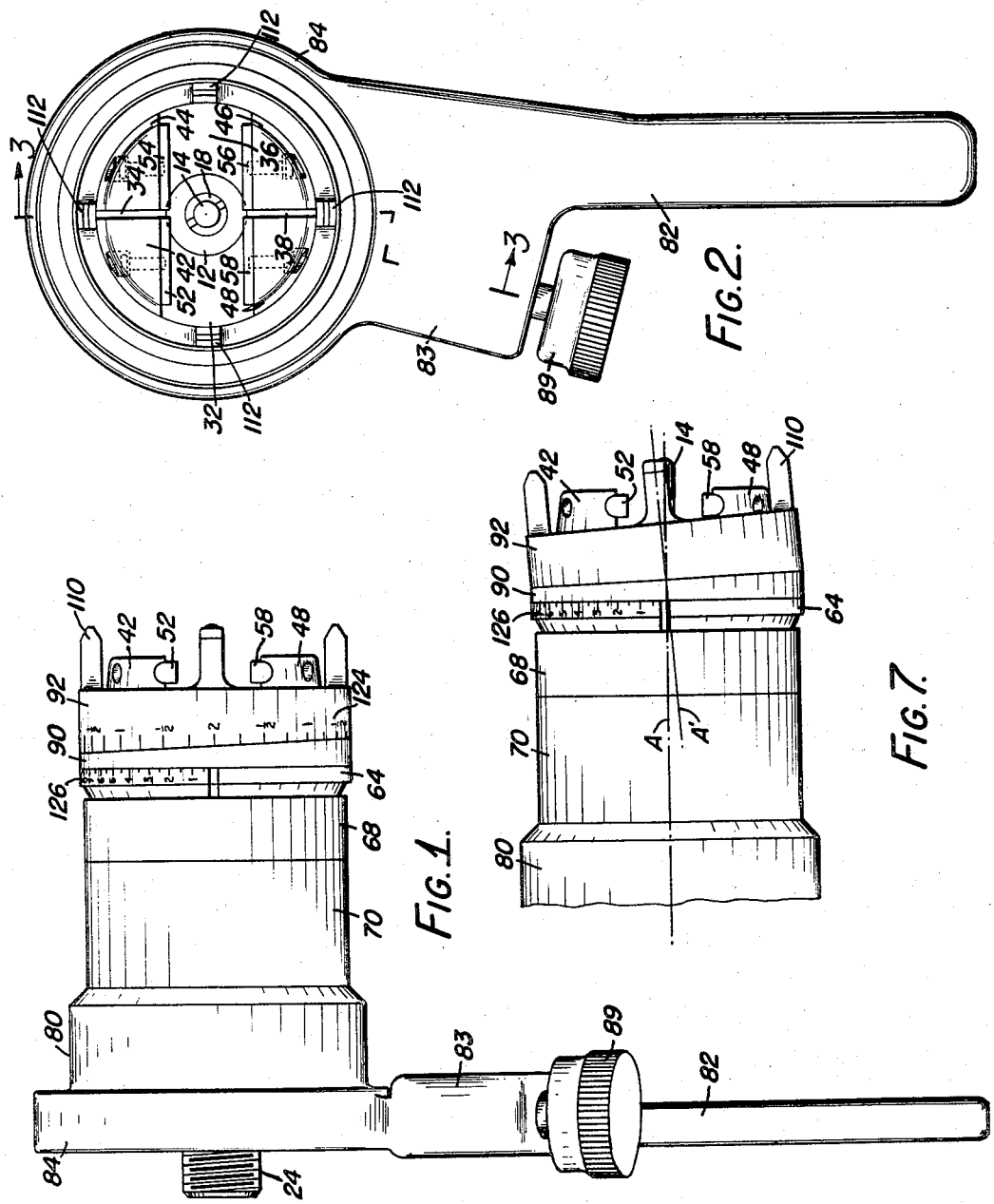
INVENTORS.
ROBERT E. ALLEN
AND WILLIAM J. KENNEDY
BY
ATTORNEY

INVENTORS.
ROBERT E. ALLEN
AND WILLIAM J. KENNEDY
BY
ATTORNEY

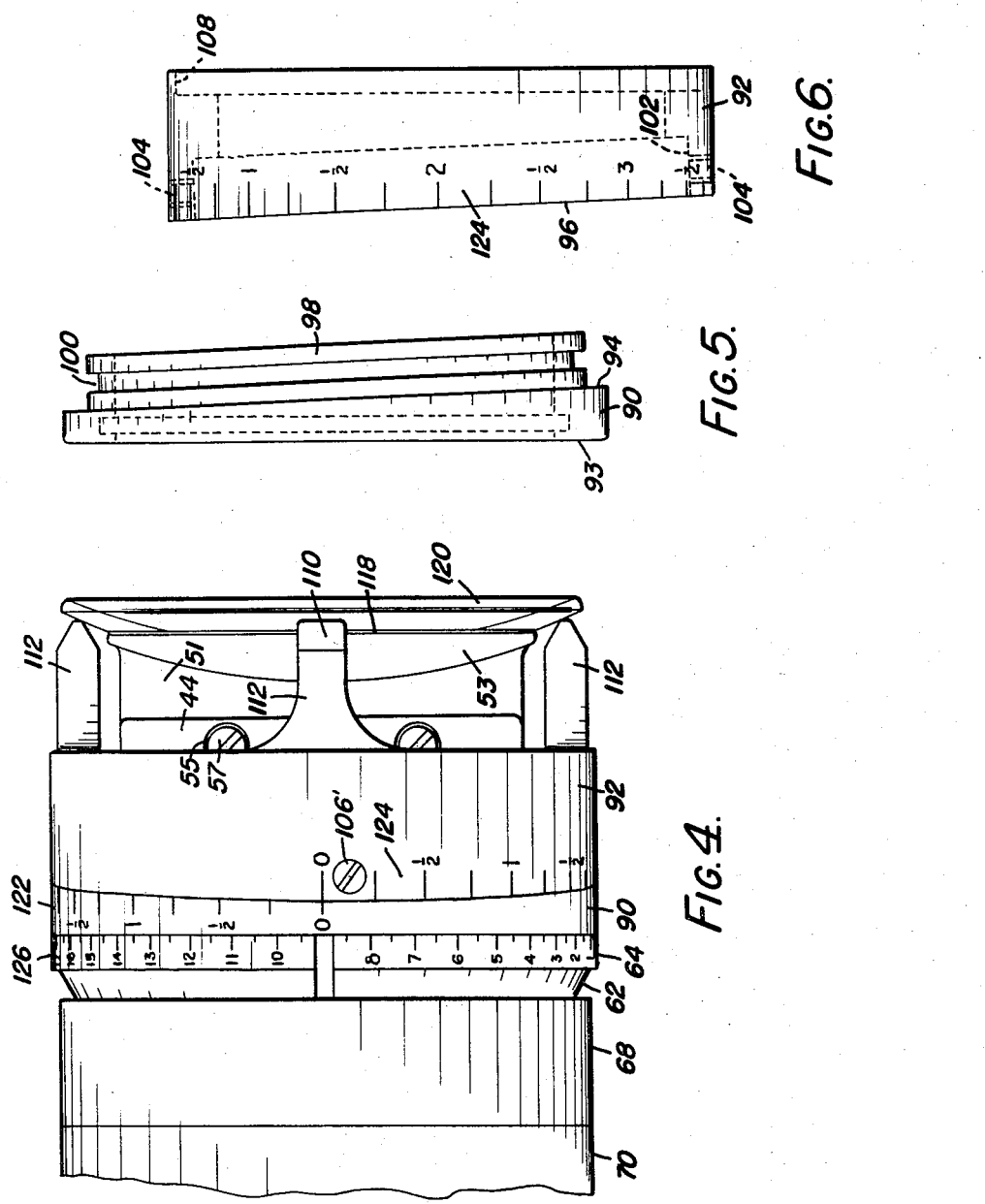

United States Patent Office 2,879,632
Patented Mar. 31, 1959

2,879,632
LENS CHUCK

Robert E. Allen, Rochester, and William J. Kennedy, Geneva, N.Y., assignors, by mesne assignments, to Textron Inc., Providence, R.I., a corporation of Rhode Island Application October 16, 1956, Serial No. 616,334

9 Claims. (Cl. 51—237)

This invention relates to a lens chuck, and more particularly to a chuck for holding a lens block, to which a lens blank has been cemented, so that a surface of the blank may be ground or polished by a machine on which the chuck is mounted.

In the manufacture of ophthalmic lenses, a lens blank is formed into a finished lens by successively grinding and then polishing first one surface and then the other. Usually one surface is concave and the other convex, and the two surfaces have different curvatures, so that the thickness of the lens varies at different points. This variation in thickness gives the optical refraction necessary to provide the desired correction in vision.

A lens blank having one of its two surfaces ground and polished is termed a semi-finished lens. The subsequent generation of the opposite surface is a more exacting operation because the second surface must not only have the correct curvature, but must bear an exact and precise relation to the previously finished surface, in order for the lens to have the ophthalmic properties desired. This precise location of the second surface with respect to the first may require either or both of two adjustments or settings, one called "axis" and the other called "prism." Setting for axis involves a rotation of the second surface with respect to the first, and setting for prism involves a tilting of the second surface with respect to the first.

The problem of correctly relating the second surface to the first has heretofore usually been handled during the blocking operation, in which the semi-finished lens blank is secured to the lens block with pitch. It has been the usual practice to block the semi-finished lens with the finished surface precisely positioned with respect to selected surfaces of the lens block. The selected block surfaces are then used to align the lens block in the lens chuck, thus indirectly aligning the lens blank with respect to the chuck. In this way, the relation of the second surface to be generated to the finished surface is primarily determined during the blocking of the lens blank. It is necessary to use elaborate blocking devices and great care in thus blocking the semi-finished lens blank. Errors in blocking are difficult to avoid, and there is also a decided possibility of error in the relationship between the selected block surfaces and the chuck.

In recent years, chucks have been used in which the position of the lens blank in the chuck is determined directly by registering pins in the chuck which engage against the finished lens surface of the blocked lens blank. A chuck of this type is described, for example, in U.S. Patent 2,573,668, issued October 30, 1951. Chucks of this type have the advantage that the registering pins are released after chucking so that any desired prism settings may be made directly in the chuck itself. However, chucks of this type suffer from the disadvantage that they are complex mechanically and include a very large number of parts. Moreover, while chucks of this type are flexible in their capacity to handle lenses having different degrees of curvature, this flexibility is obtained only through time-consuming substitutions of parts.

An object of the present invention is to provide a mechanically simple lens chuck in which a blocked lens blank may be held in an inclined position during grinding to incorporate prism in the lens.

Another object of the invention is to provide a mechanically simple, relatively inexpensive lens chuck in which a blocked lens blank may be held in an inclined position to incorporate prism in the lens, and at an orientation such that the prism angle is in the proper meridian.

A further object of the invention is to provide a mechanically simple lens chuck in which the chuck may accommodate lens blanks of different curvatures much more simply than is now possible.

Still another object of the invention is to provide a lens chuck which is calibrated so that a blocked semi-finished lens may readily be adjusted in a lens generating machine or the like to position it to grind a desired amount of prism in the lens, in the desired meridian.

Yet another object of the invention is to provide a lens chuck by means of which a blocked semi-finished lens may be secured in a lens generating machine and positioned with respect thereto for the incorporation of prism in the lens at a properly oriented prism angle, and in which means are provided to compensate for inaccuracies on the part of an operator in blocking the lens blank.

Still a further object of the invention is to provide a lens chuck for holding an inclined, oriented blocked lens blank in a lens generating machine, so that the finished surface of the lens blank is directly and continuously engaged throughout grinding in such a way that no damage to the finished surface can occur because of pressure exerted on the lens blank during grinding.

Other objects of the invention will become obvious to those skilled in the art from consideration of the following detailed description of the invention and from a consideration of the drawings which show a specific embodiment thereof.

In the chuck which is illustrated in the drawings, there are two rings, which are wedge-shaped in axial section, and which have contiguous inclined surfaces, and which may be rotated with respect to each other to adjust the lens blank, that is supported in the chunk, so as to produce the desired amount of wedge angle or prism when the chuck is ground. These rings are also rotatable bodily together, so that, once having determined the amount of prism by moving the rings with respect to each other, both rings may be rotated as a unit to orient the prism angle in the proper meridian.

The chuck is provided with collet jaws for gripping the tang of the lens block. Jaw blocks are mounted on the confronting faces of the collet jaws, to engage the tang of the block. These jaw blocks are mounted to rock slightly relative to the jaws, to permit the jaw blocks to grip an inclined lens block at any inclination and orientation thereof.

The rear prism ring is mounted around the collet jaws to engage against a radial shoulder formed on the outer surface of the jaws. The front prism ring is mounted around the collet jaws so that its inclined surface engages against the inclined surface of the rear prism ring. A plastic lens positioning ring, having four forwardly extending fingers, is mounted on the front prism ring so that its fingers extend forward of the collet jaws to engage against the rear, finished surface of the blocked lens blank. The prism rings are secured together and to the collet so that each ring is free to rotate relative to the other and to the cylinder, but so that relative axial movement is prevented.

The fingers of the lens positioning ring are formed with tips that engage against the finished surface of the blocked lens blank. In this way, any pressure that is applied to the lens blank during grinding is distributed over the area of the several tips.

To hold a blocked, semi-finished lens blank in the chuck during grinding, the tang of the lens block is clamped between the jaw blocks, with the margin of the finished surface of the lens blank engaged against the fingers of the lens positioning ring. If no prism is required, the rings are positioned so that both are coaxial with the collet. To incorporate prism in the lens, the prism rings are rotated with respect to each other to produce the proper amount of wedge angle or prism, and then both rings are rotated simultaneously to orient the prism angle in the proper meridian. The lens block is then gripped between the jaws, with the margin of the finished surface of the lens engaged against the fingers of the lens positioning ring. As the tang is gripped, the jaw blocks rotate relative to the collet fingers, as necessary, to compensate for the inclination of the block.

The details of the invention may be best understood by reference to the following description, taken together with the drawings.

In the drawings:

Fig. 1 is a side elevation showing a lens chuck constructed according to one embodiment of the invention;

Fig. 2 is an end view thereof;

Fig. 4 is a fragmentary plan view on the scale of Fig. 3 showing particularly the lens adjusting mechanism of the chuck;

Fig. 5 is a side elevation, also on the scale of Fig. 3, of one of the prism rings constituting part of this adjusting mechanism;

Fig. 6 is a side elevation on the same scale of the other prism ring; and

Fig. 7 is a fragmentary side elevation similar to that of Fig. 1 but showing the lens block adjusting mechanism adjusted to a position to incorporate prism in the lens.

Figure 3:
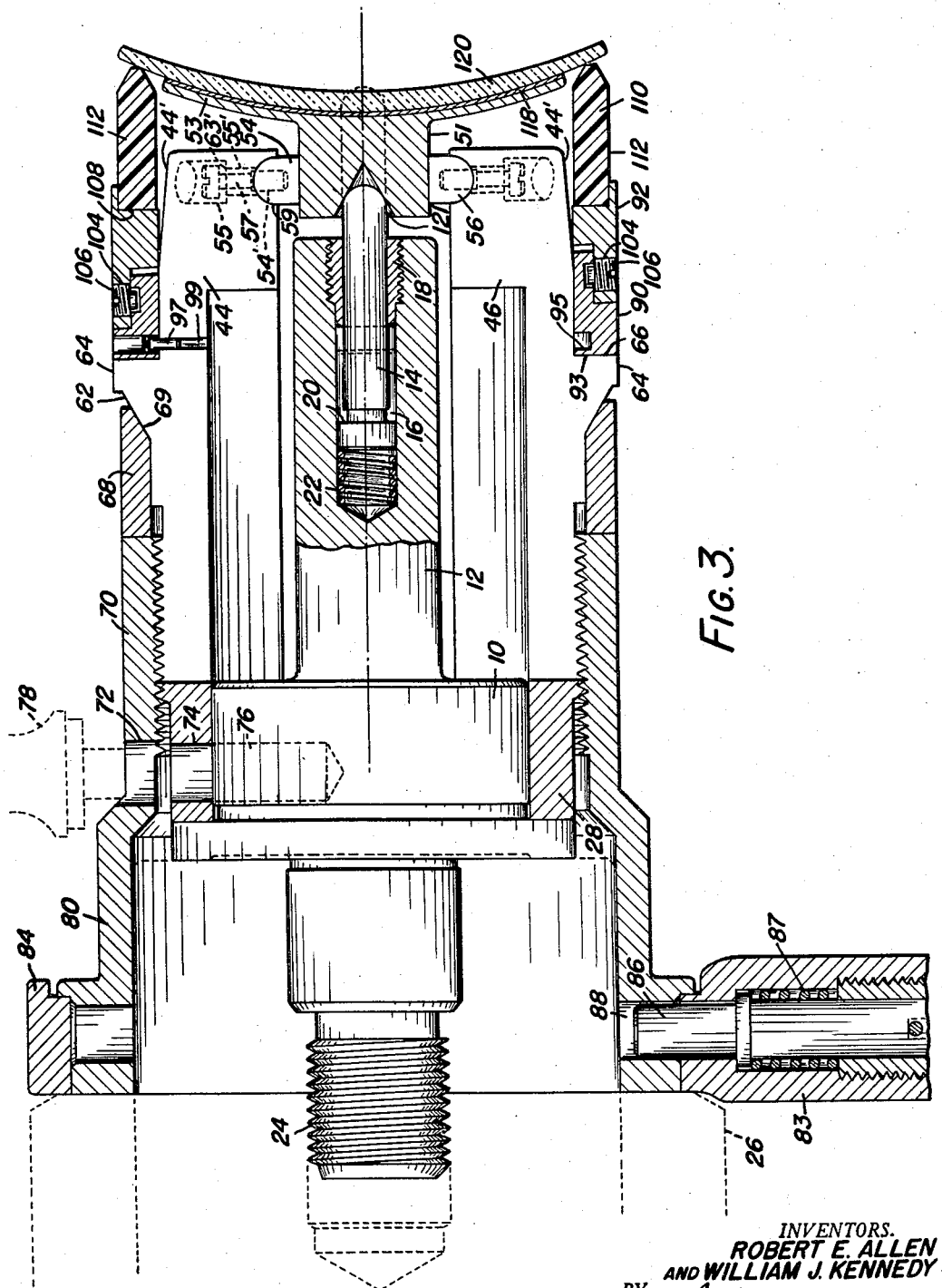
Fig. 3 is an axial section of this chuck on an enlarged scale, showing a blocked lens blank mounted on the chuck.

Referring now in detail to the drawings, the chuck assembly comprises a centering hub 10 (Fig. 3) formed with a reduced forwardly-projecting axial extension 12. A locating pin 14 is mounted in an axial recess 16 formed in the front end of the reduced extension 12. This locating pin 14 protrudes from the recess 16 through an aperture in a retainer bushing 18 that is threaded into the open end of the recess 16 and that is adapted to engage a shoulder 20 formed on the locating pin to limit forward movement of the pin. A spring 22 is interposed between the locating pin and the base of the recess constantly to press the pin outwardly of the recess.

The hub 10 is also formed with a rearwardly-projecting stud 24. The stud 24 is threaded for insertion in the arbor 26 (outline indicated in Fig. 3) of a grinding machine. The stud 24 is coaxial with the centering hub 10, its reduced extension 12, and the locating pin 14.

A collet 28 is secured on the centering hub 10 by a shrink fit, key or other conventional means. This collet 28 has four radial, angularly-spaced, axially extending slots 32, 34, 36 and 38 (Fig. 2), that provide four collet fingers 42, 44, 46 and 48, respectively. The slots 32 and 36 are aligned and are relatively wide to provide a large jaw opening in which the tang 51 (Fig. 3) of a block 53 may be inserted. The slits 34 and 38 are of just sufficient width to allow for contraction of the collet fingers to provide gripping action.

Four jaw blocks 52, 54, 56 and 58 respectively are mounted on the collet jaws. Each is formed with a round bottom that engages in a correspondingly round socket in the respective face of the collet finger to which it is secured. Each jaw block is secured by a screw 57 in a half-round socket 59 formed on the inner face of the collet fingers 42, 44, 46, or 48 on which the block is mounted. The screw is mounted in an aperture 55 that extends from the outer face of the collet finger to the socket. The aperture 55 is of reduced diameter as denoted at 55' between its outer portion and socket 56. This provides a shoulder 63'. The head of the screw 57 is freely engaged in the larger diameter outer portion of the aperture 55. The shank of the screw extends freely through the reduced diameter portion 55' of the aperture, and is threaded into a recess 54' in the jaw block 54. The head of the screw 57 is adapted to engage against the shoulder 63' to prevent the jaw block 54 from dropping inwardly out of its socket. Since there is free play between the screw 57 and the aperture 55, each jaw block 54 is free to rock slightly relative to its collet finger or jaw so that the jaw blocks together can compensate for irregularities in the tang 51 of the blocking body 53.

The collet jaws have inclined conical outer surfaces 62 along a portion of their lengths and each collet jaw or finger is formed forward of this conical surface with a plane surfaced radially-extending shoulder 66. The two surfaces 62 and 66 are connected by an outer cylindrical surface 64. A sleeve 68 is mounted around the collet and is axially slidable on the jaws of the collet. It has an internal conical surface 69 that is adapted to cooperate with the external conical surfaces 62 of the collet jaws to move the jaws to clamping position. A collar 70 is threaded on the rear of the collet to engage against the rear face of the sleeve 68 to move the sleeve 68 axially forward to move the collet jaws to clamping position.

The rear portion 80 of the collar 70 fits over the front of the arbor 26 and is mounted to rotate about the arbor. A ring 84 is mounted around the rear portion 80 of the collar. This ring has a laterally projecting portion 83 (Fig. 2) that is formed with a handle-like extension 82. A spring-pressed plunger 86 is mounted in the lateral projection 83 and may be engaged selectively in any one of several equi-angularly spaced holes 88 in the wall of the collar, to lock the handle-like extension 82 on the collar in any convenient operating position. By manipulating the handle-like extension 82, the collar 70 may be rotated in one direction or the other, to move the ring 68 forward to contract the collet jaws, or release the ring 68 and allow expansion of the collet jaws. Plunger 86 is held in locking position by a coil spring 87 and may be disengaged by pulling on its knurled knob 89.

A pair of rings or prism rings 90 and 92 having complementary abutting inclined surfaces 94 and 96 (Figs. 5 and 6) are mounted adjacent the front end of the extension 12, around the collet jaws.

The back ring 90 (Fig. 5) has a flat rear face 93 that extends at right angles to the axis of the ring, and that is adapted to seat against the shoulders 66 on the collet jaws. An annular channel 95 is formed on the inner wall of this ring to receive the projecting end of a pin 97. This pin is engaged in a radial aperture 99 in the wall of the collet finger 44, and permits the ring 90 to be rotated on the collet jaws but prevents relative axial movement of the ring thereon. The back ring 90 has a front surface 94 that is inclined to its axis and that forms a seat for a corresponding inclined rear surface 96 on the front ring 92 when the two rings are assembled on the collet.

The back ring 90 is formed with a forwardly-extending generally cylindrical portion 98, that is of reduced diameter and that extends forward of surface 94 and that is formed with a peripheral groove 100 whose walls are parallel to the surface 94. The front ring 92 (Fig. 6) is formed with a counterbored recess 102 at its rear, to telescope over the reduced diameter portion 98 of the rear ring. A plurality of threaded apertures 104 are formed in the side wall of the ring 92 around this counterbore. Set-screws 106 are threaded into the apertures 104 and engage in the groove 100 to hold the two rings 90 and 92 against relative axial movement but to permit relative rotation between the two rings.

The front ends of the collet jaws are gradually relieved, as denoted at 44' in Fig. 3, to permit adjustment of the two prism rings 90, 92 to any required angular positions about the jaws without interfering with the operation of the jaws.

The ring 92 is formed with an annular recess 108 on its front face. A lens positioning ring 110 is seated in the recess 108. This ring 110 is formed with four forwardly projecting fingers 112 spaced 90° apart. These four fingers are of precisely the same length and their tips are all exactly in the same plane, which is normal to the axis of the lens positioning ring, and to the axis of the chuck when no prism is to be incorporated in the lens blank.

The prism rings 90 and 92 are graduated, as denoted at 122 and 124, respectively, to indicate diopters of prism when generating both plus and minus curves. The cylindrical surface 64 of the collar 60 is graduated, as denoted at 126 (Figs. 1 and 7), for prism axis markings in numerals which may be, for example, 0 to 18 inclusive, to represent 0° to 180°. The prism axis markings facilitate orientation of the prism angle to the proper meridian.

To position the chuck on the grinding machine, the threaded stud 24 is inserted in the arbor 26 of the machine, and is tightened by hand. The arbor is then rotated so that the gripping surfaces of the jaw blocks 52, 54, 56, and 58, are parallel with the ways of the generating machine, and so that the prism axis markings 126 are visible. The arbor is then tightened in the generating machine. The collar 70 is then rotated until the hole 72 (Fig. 3) registers with the registered apertures 74 and 76 in the sleeve 28 and centering hub 10 respectively. A locking bar 78 is then inserted in the registered apertures, and is struck several times to insure positive locking of the holder assembly in the arbor.

To grind a lens blank 120, the lens blank is first mounted on a lens block 53 by cementing it to the front face of the lens block by cement or pitch 118. The tang 51 of the lens block is then inserted between the collet jaws of the chuck until the exposed marginal portion of the finished surface of the blocked lens blank 120 is pressed firmly against the four fingers 112 of the lens positioning ring 110, and pin 14 of the chuck engages in the center hole 121 (Fig. 3) in the rear face of the tang. The lens positioning ring selected for use will have fingers 112 of the proper length for the curvature of the lens to be ground. After positioning the lens block in the chuck, the lens blank is held firmly while the handle 82 is moved to rotate the collar 70 to force the clamping sleeve 68 forwardly against the inclined surface 62 of the collet jaws, thereby to contract the collet jaws 42, 44, 46 and 48 and clamp the tang 51 securely between the jaw blocks 52, 54, 56 and 58.

When prism is desired, before the blocked lens blank is gripped in the chuck, the prism rings are rotated relative to each other so that the lens blank will be positioned relative to the grinding wheel of the machine to produce the proper amount of wedge angle or prism in the lens when it is ground. As shown in Fig. 7, the relative rotation between the prism rings inclines the axis A' of the front ring 92 to the axis A of the hub 10 and arbor 26. The desired amount of prism can be selected by registering the graduations 122 on the rear ring 90 with the appropriate graduations 124 on the front ring 92 (Fig. 4). Both rings are then rotated as a unit on the collet to orient the prism angle in the proper meridian. This is accomplished by proper alignment between the registered graduations on the two prism rings with the graduations on the cylindrical surface 64 of the collet. As a specific example, assume that a minus curve is desired requiring two and three-quarter diopters of prism at 35°. When the prism rings are calibrated in diopters, as shown in Fig. 4, this amount of prism is obtained by aligning the 2¾ marking on the front ring 92 with the 2¾ marking on the rear ring 90. The aligned prism rings are then rotated as a unit to the point where the aligned 2¾ graduations on the prism rings are aligned with the graduation half-way between the numerals 3 and 4 on the scale 126, which graduation indicates 35°. This 35° point would be the apex of the prism.

When the prism rings have thus been set, a lens positioning ring is selected, as before, having fingers of the proper length for the curvature of the lens that is to be ground. The lens positioning ring 110 is then placed in the recess 108 on the front face of the ring 92, and the tang 51 of the lens block is inserted between the collet jaws. The blocked lens blank is maneuvered so that the four fingers of the lens positioning ring engage with equal pressure against the exposed marginal portion of the finished surface of the lens blank. The collet jaws are then contracted to grip the tang.

Since the axis A' of the lens positioning ring, and the tank 51, are inclined to the axis A of the chuck, as the jaw blocks 52, 54, 56, 58 engage against the tang, each jaw block is rocked in its seat so that the plane face of each jaw block lies in a plane that is substantially parallel to the axis A' of the inclined ring 110. When the inclined block has been firmly gripped by the collet jaws, the lens may then be ground to generate the desired curve that incorporates the selected prism at the proper orientation.

It will be apparent from the foregoing that a universal tilting action is obtained between the blocked lens blank 120 and the chuck, and that the lens positioning ring can be inclined so that the coplanar front bearing surfaces on the four fingers lie in any plane desired within the limit of tilt of the prism rings. Since the jaw blocks are mounted to rock or incline relative to their jaws, the tang of the block can be gripped securely in any inclined position of the blocked lens blank. This universal tilting action enables the rear finished surface of the lens blank 120 to be precisely registered against the bearing surfaces on the lens positioning ring fingers before the tang is clamped in position.

If it is necessary to caliper the lens during the grinding of the second or front surface of the lens, the blocked lens blank may be removed from the chuck for calipering, and again clamped in the chuck as above described, without loss of proper registration, it being merely necessary to be certain that the same side of the tang is toward the top of the chuck as before.

While all of the parts of the chuck may be metal, it is desirable that the lens positioning ring 110 be made of plastic, preferably a plastic of limited resilience, so that the bearing faces of the fingers will not mar the finished surface of the lens blank on which they engage. Since no two operators use the same amount of pitch in blocking, and since lens blanks differ in their curvature, it is desirable that a plurality of lens positioning rings be provided, each having fingers differing in length from the fingers on the other positioning rings, to enable the chuck to be used for lens blanks having a variety of different curvatures.

While specific reference has been made to the use of a lens positioning ring having four fingers, it will be appreciated by those skilled in the art that any number of fingers greater than two, or even a solid flange, will accomplish the purpose of inclining the lens body to conform to the inclination of the lens positioning ring.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A lens chuck comprising a plurality of jaws for grippingly holding a workpiece, means for moving said jaws to gripping position, a pair of rings, one of which is rotatably adjustable relative to the other about its axis, said rings surrounding said jaws and having contiguous plane faces which are inclined at other than right angles to their respective axes, means connected to said jaws against which the distal face of one of said rings seats to determine the position of said rings axially relative to said jaws, and means on the distal face of the other ring against which the workpiece seats when grippingly held by said jaws.

2. A lens chuck comprising a plurality of jaws for grippingly holding a workpiece, means for moving said jaws to gripping position, a pair of rings, one of which is rotatably adjustable relative to the other about its axis, said rings surrounding said jaws and having contiguous plane faces which are inclined at other than right angles to their respective axes, the distal face of one of said rings being plane and extending at right angles to the axis of said one ring, a plane seating surface connected to said jaws against which said distal face seats for positioning said rings axially relative to said jaws, and seating means on the distal face of the other ring against which the workpiece seats when grippingly held by said jaws, the tip surface of said seating means lying in a plane perpendicular to the axis of said other ring.

3. A lens chuck comprising a split collet having a plurality of jaws, an actuating ring surrounding said collet and movable axially of said collet in one direction to move said jaws to gripping position, a pair of rings, one of which is rotatably adjustable relative to the other about its axis, said rings surrounding said jaws and having contiguous plane faces inclined at other than right angles to the axes of said collet, means on said collet on which the distal face of one of said rings seats for positioning said rings axially relative to said jaws, means on the distal face of the other ring on which the workpiece seats when it is grippingly held by said jaws, and means for moving said actuating ring in said one direction comprising a sleeve threaded on said collet, said sleeve having a plurality of holes in it spaced angularly about its periphery, a yoke mounted coaxially with said sleeve and rotatable about the axis of said sleeve, a lever secured to said yoke for rotating siad sleeve, and a spring-pressured detent engageable selectively with any one of said holes and movable in said yoke to releasably connect said yoke to said sleeve by engagement of said detent with one of said holes.

4. A lens chuck comprising a split collet having a plurality of spring fingers adapted to grip and hold between them a lens block, a first ring rotatably mounted around said fingers coaxially with said collet and having a plane front surface inclined at other than right angles to the axis of said collet, a second ring rotatably mounted around said collet and having a rear plane surface inclined to the axis of said collet at an angle corresponding to the angle of inclination of said front surface, said rear surface seating on the first-named plane surface, said second ring having a front plane surface at a right angle to its axis, whereby rotation of said first ring causes the axis of said second ring to incline relative to the axis of said collet and of said first ring, and means carried by said second ring to engage a lens blank blocked on said block to hold said lens blank at an inclination conforming to the inclination of the front plane surface of said second ring.

5. A rotary lens chuck for holding a lens block that has a rearwardly extending boss, comprising a split collet having a plurality of jaws, a plurality of jaw blocks for engaging said boss, each jaw block being mounted to rock on each said jaw about an axis inclined to the axis of said collet, means to contract said jaws, a lens positioning ring mounted on said collet about the jaws of said collet and having at least three fingers rigidly secured thereto circumferentially spaced thereon and projecting forwardly therefrom, each finger having a tip surface, said tip surfaces lying in a single plane that is perpendicular to the axis of said ring and being adapted to engage against the rear surface of a lens carried by said lens block, means to incline said positioning ring to incorporate prism in the surface to be generated on said lens, and means to rotate said inclined lens positioning ring to orient the prism in the proper meridian.

6. A lens chuck comprising a split collet having a plurality of jaws, a jaw block mounted to rock on each said jaw, means to contract said jaws, said collet being formed externally with a shoulder lying in a plane perpendicular to its axis, a first ring surrounding said jaws and rotatably mounted on said collet coaxially therewith and having a plane rear surface that seats against said shoulder, said first ring having a plane front surface inclined at other than right angles to said axis, a second ring surrounding said jaws and rotatably mounted on said first ring and having a plane rear surface which is inclined at an angle to its axis corresponding to the angle of inclination of said plane front surface to the axis of said collet, said last-named plane rear surface abutting against the plane front surface of said first ring, said second ring having a front plane surface at a right angle to the axis thereof, said two rings being secured together against relative axial movement with their inclined plane surfaces engaged whereby rotation of said first ring causes the axis of said second ring to incline relative to the common axis of said collet and said first ring, and a lens positioning ring mounted on said second ring coaxial with said second ring, said lens positioning ring having at least three fingers circumferentially spaced thereon and projecting forwardly therefrom, said fingers being all of the same length and having tip surfaces lying in a single plane that is perpendicular to the axis of said lens positioning ring.

7. A lens chuck comprising a split collet having a plurality of jaws, a jaw block mounted to rock on each said jaw, means to contract said jaws to move them to gripping position, said collet having a radial shoulder, a first ring rotatably mounted coaxially on said collet around said jaws and having a plane rear surface that is abutted against said shoulder, said first ring having a plane front surface inclined at other than right angles to the axis of said collet, a second ring rotatably mounted on said collet around said jaws and having a plane rear surface whose inclination corresponds to the inclination of said plane front surface, the second-named rear surface abutting against the plane front surface of said first ring, said second ring having a front plane surface at a right angle to the axis thereof, said two rings being secured together against relative axial movement with their inclined plane surfaces engaged whereby rotary adjustment of either ring to adjust a lens blank carried by said chuck for prism causes the axis of said ring to incline relative to the common axis of said collet and said first ring, a lens positioning ring mounted on said second ring coaxial with said second ring, said lens positioning ring having at least three fingers rigid therewith and circumferentially spaced thereon and projecting forwardly therefrom, each finger having a tip surface, said tip surfaces lying in a single plane that is perpendicular to the axis of said lens positioning ring, said first and second rings having cooperating indicia thereon for rotatably setting the required prism, and said first ring and collet having cooperating indicia for orienting the prism to proper meridian.

8. A lens chuck comprising a split collet having a plurality of jaws, a jaw block mounted to rock on each said jaw, means to contract said jaws to move them to gripping position, said collet having a radial shoulder, a first ring surrounding said collet and rotatably mounted coaxially on said collet and having a plane rear surface that is abutted against said shoulder, said first ring having a plane front surface inclined at other than right angles to the axis of said collet, a second ring rotatably mounted on said collet and having a plane rear surface inclined to its axis at the same angle as said plane front surface is inclined to the axis of said collet, the second-named plane rear surface abutting against the plane front surface of said first ring, said second ring having a front plane surface at a right angle to its axis, said two rings being secured together against relative axial movement with their abutting plane surfaces engaged whereby rotation of said first ring causes the axis of said second ring to incline relative to the common axis of said collet and said first ring, a lens positioning ring mounted coaxial with said second ring, said lens positioning ring having at least three fingers circumferentially spaced thereon and projecting forwardly therefrom, each finger having a tip surface, said tip surfaces lying in a single plane that is perpendicular to the axis of said lens positioning ring, said first and second rings having cooperating indicia graduated in diopters of prism.

9. A lens chuck comprising a split collet having a plurality of jaws, a jaw block mounted to rock on each said jaw, means to contract said jaws to move them to gripping position, said collet being formed with a radial shoulder, a first ring rotatably mounted coaxially on said collet and having a plane rear surface that is abutted against said shoulder, said first ring having a plane front surface inclined at other than right angles to the axis of said collet, a second ring rotatably mounted on said collet and having a plane rear surface inclined at the same angle to its axis as said plane front surface is inclined to the axis of said collet, the second-named rear surface abutting against the plane front surface of said first ring, said second ring having a front plane surface at a right angle to the axis thereof, said two rings being secured together against relative axial movement with their inclined plane surfaces engaged whereby rotation of said first ring causes the axis of said second ring to incline relative to the common axis of said collet and said first ring, a lens positioning ring mounted coaxial with said second ring, said lens positioning ring having at least three fingers rigid therewith and circumferentially spaced thereon and projecting forwardly therefrom, cooperating indicia on the first and second rings graduated in diopters of prism, and cooperating indicia on said second ring and collet to indicate the meridian of the prism angle.

References Cited in the file of this patent

UNITED STATES PATENTS

| | | |
|---|---|---|
| 375,011 | Shaw | Dec. 20, 1887 |
| 2,441,472 | D'Avaucourt | May 11, 1948 |
| 2,573,668 | Long et al. | Oct. 30, 1951 |